June 24, 1941.   F. C. BEST   2,246,661
MOTOR VEHICLE
Filed May 24, 1939

INVENTOR.
Frank C. Best
BY
Tibbetts & Hart
ATTORNEYS

Patented June 24, 1941

2,246,661

UNITED STATES PATENT OFFICE 2,246,661

MOTOR VEHICLE

Frank C. Best, Detroit, Mich., assignor to Packard Motor Car Company, Detroit, Mich., a corporation of Michigan Application May 24, 1939, Serial No. 275,500

8 Claims. (Cl. 280—95)

This invention relates to motor vehicles and particularly to improvements in the steering mechanism thereof.

In present day motor vehicle design, and particularly in connection with independently suspended guiding road wheels, it is an accepted theory that to obtain geometrically correct steering it is desirable to provide transverse steering control rods of equal length connected to the steering knuckle arms and terminating end to end midway between the wheels.

It is further believed that to prevent wheel tilting, excessive tire wear, "wheel fight," vibration of the vehicle and generally incorrect steering geometry, the ends of the steering control rods adjacent the vehicle centerline should be constrained to move as nearly as possible in a straight transverse line during the application of steering force thereto.

It is the primary object of the present invention to generally improve the steering mechanism of motor vehicles and more particularly to provide means for reducing to a minimum arcuate movement of transverse steering control rods of independently suspended vehicle wheels.

A further object resides in the provision of a steering mechanism incorporating a hydraulic shock absorber and employing a portion of such shock absorber to cooperate with other mechanism to constrain the movement of the steering control rods in substantially a straight transverse direction.

Other objects and advantages of the invention will become apparent from the following description taken in connection with the accompanying drawing, in which Fig. 1 is a top plan view of the forward end of a vehicle chassis including guiding road wheels, independent wheel suspension assemblies and steering mechanism embodying the present invention;

Figure 1:
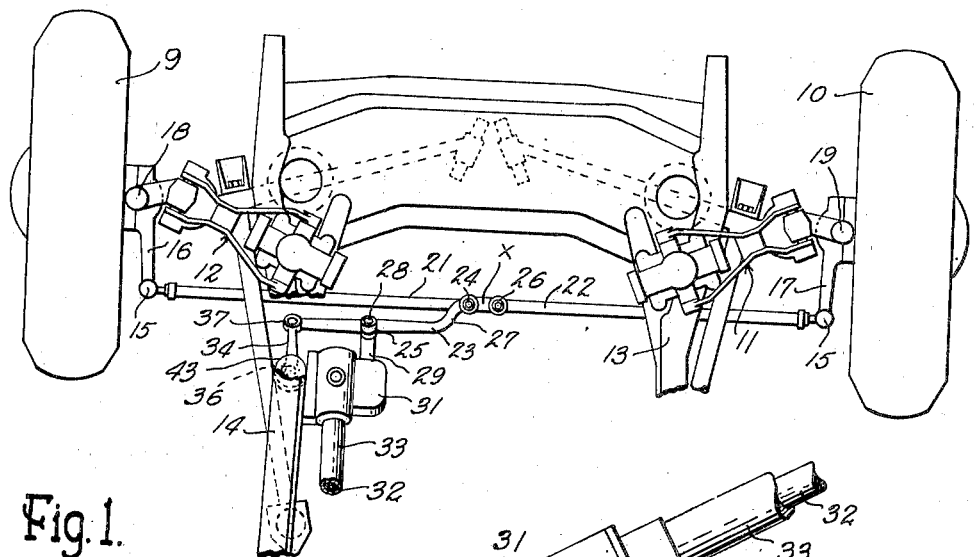
Figure 2:
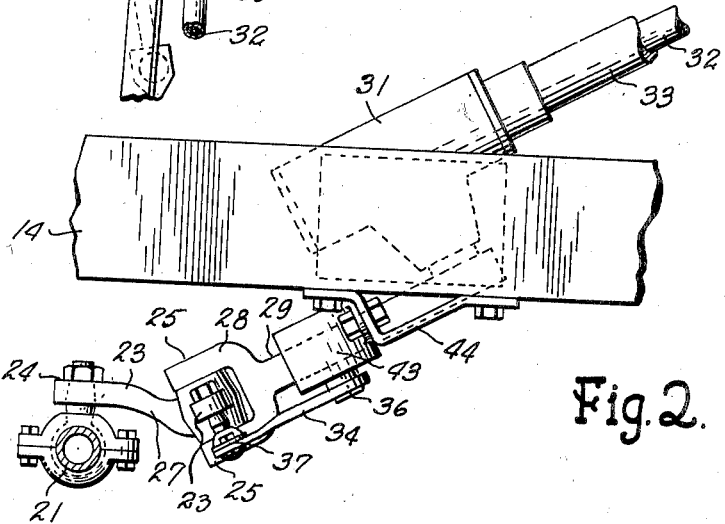
Fig. 2 is a fragmentary view showing the lower end of the steering column, shock absorber and the associated mechanism for controlling the transverse movement of the steering control rods.

Referring to the drawing, reference numerals 9 and 10 indicate the vehicle guiding road wheels which are independently suspended in a conventional manner by link and spring units 11 and 12 which are in turn supported by the vehicle side frame members 13 and 14. Conventional steering knuckle arms 16 and 17 are connected to the wheels and adapted to be swung about king-pin pivots 18 and 19 to effect the steering of the vehicle.

To avoid many of the disadvantages heretofore pointed out and to obtain substantially geometrically correct steering, the steering knuckle arms 16 and 17 may be actuated by transversely aligned steering control rods 21 and 22 of equal length, universally pivoted at 15 to the ends of the steering knuckle arms 16 and 17 and extending transversely to terminate with their adjacent ends at or near the longitudinal mid-line of the vehicle where they are pivotally connected to and supported by the parallel end of a lateral arm 23 by ball and socket joints as at 24 and 26. The lateral arm 23 is curved rearwardly as at 27 to clear the steering control rod 21 with which it is generally parallel. This rod 23 is suitably pivotally connected and supported intermediate its ends as at 28 by bifurcated portions 25 of an arcuately movable and angularly extending steering lever 29, which in turn is connected to be actuated by the usual steering gears (not shown) within the casing 31 that is fixed to the frame member 14. The steering gears are controlled in the usual manner by a steering tube 32 within the steering column 33 and which in turn is rotated by the conventional steering wheel (not shown).

Thus it will be seen that movement of the steering lever 29 in its arcuate path and the resulting rotation of the steering knuckle arms 16 and 17 about their respective pivots 18 and 19 ordinarily would tend to cause a substantial fore and aft swinging movement of the steering control rods 21 and 22 which would be of the greatest magnitude at the point "X" adjacent the centerline of the vehicle. This condition causes a variation in the effective lengths of the control rods 21 and 22 giving rise to the objections heretofore outlined.

To substantially eliminate this fore and aft swinging movement of the steering control rods, it is, in accordance with the present invention, desirable to constrain the normal movement of the lateral arm 23 so that it will operate in substantially a straight transverse line. This may be accomplished by the provision of a compensating member in the form of an angularly extending, arcuately movable lever 34 carried on a fixed pivot 36 adjacent the steering column 33 in a plane parallel to the steering lever 29. This lever 34 is shorter than the steering lever 29 and is connected for universal movement to the free or remote end of the lateral arm 23 by a pin and a ball and socket joint as at 37.

In some instances it is desirable to connect a hydraulic shock absorber to the steering gear for the purpose of controlling the vehicle in case of tire blow out. Usually these shock absorbers are of the conventional type except that the valve mechanism is such that there will be no retarding of the steering connections except when the shock or sudden movement comes from the wheels. Such a shock absorber 43, in the present invention, may be made a part of the lever 34. This shock absorber is preferably of the vane type and the housing is carried by a bracket 44 fixed on the frame member 14. The movable arm of the shock absorber constitutes the compensating lever 34.

Figure 3:
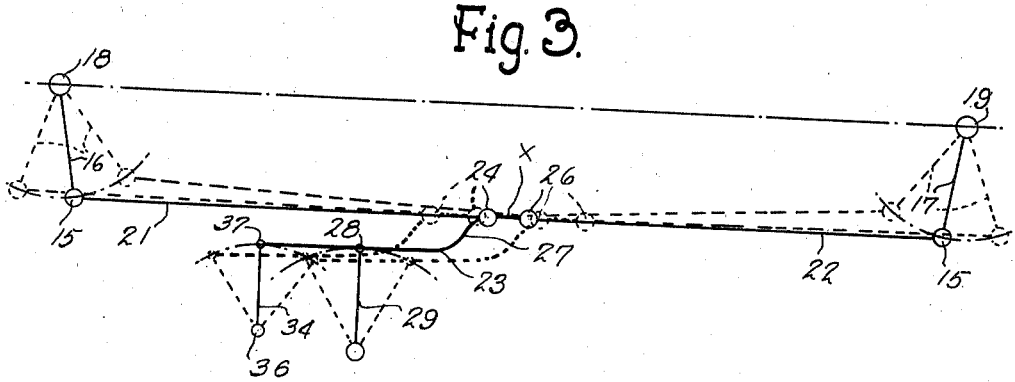
Fig. 3 is a diagrammatic plan view showing the operating movement of the steering mechanism.

Referring particularly to Fig. 3 wherein the geometry of the present system is diagrammatically shown, the levers 29 and 34, the lateral arm 23 and control rods 21 and 22 assume the dotted line positions when the steering lever 29 is moved from center either to the right or left steering position. It will be seen that the length of the compensating lever 34 and thus the radius of its arc is of such relation to the length and radii of the arcs of the steering lever 29 and steering knuckle arms 16 and 17 that, throughout its travel, it will tend to restrain the end of the lateral arm 23 from a natural tendency to move in an arc of greater magnitude in response to the arcuate movement of the steering lever 29. Thus the ends of the controlling rods 21 and 22 at the point "X" are constrained to move in substantially a straight transverse line minimizing fore and aft movement at this point and resulting in improved steering control.

It will be obvious to those skilled in the art that various modifications in construction and design may be made without departing from the spirit or scope of the invention which is to be limited only by the scope of the appended claims.

What is claimed and desired to be secured by Letters Patent is:

1. In a motor vehicle having guiding road wheels, a pair of transverse steering control rods connected to steer said wheels, a lateral arm pivotally connected at one end to said steering control rods and extending toward one side of said vehicle, swingable means pivoted to an intermediate portion of said arm to cause lateral movement, and compensating means connected to the free end of said lateral arm, and anchored to move parallel with said swingable means, said compensating means influencing said lateral arm to restrain fore and aft movement of said steering control rods and actuated by said swingable means.

2. In a motor vehicle having guiding road wheels, a pair of transverse steering control rods connected to said road wheels and terminating adjacent the vehicle centerline, a lateral arm pivotally connected to the inner ends of said control rods and extending parallel thereto toward one side of the vehicle, a steering lever pivotally connected to said lateral arm between its ends, means operable to swing said lever, and compensating lever means mounted on a fixed pivot at one end and pivotally connected to the free end of said lateral arm, said compensating lever means being substantially parallel with said steering lever and adapted to constrain the point of connection between said lateral arm and said steering control rods to move the same in substantially a straight line.

3. In a motor vehicle having guiding road wheels, a pair of transverse steering control rods connected to steer said wheels, a lateral arm pivotally connected at one end to said steering control rods and extending toward one side of said vehicle, a manually operable lever connected to an intermediate portion of said lateral arm and operable to cause lateral movement thereof, and a shock absorber fixed on the vehicle and having a lever substantially parallel with the manually operable lever and connected to the free end of said lateral arm, said shock absorber lever influencing said lateral arm to restrain fore and aft movement of said steering control rods.

4. In a motor vehicle having guiding road wheels, a pair of transverse steering control rods connected to steer said wheels, a lateral arm pivotally connected at one end to said steering control rods and extending toward one side of said vehicle in parallel relation to the rods, manually operable means connected to an intermediate portion of said lateral arm and adapted to cause lateral movement thereof, and a shock absorber fixed on the vehicle having a movable restraining member connected to the free end of said lateral arm in parallel relation with said manually operable means, said shock absorber member being adapted to influence said lateral arm to restrain fore and aft movement of said steering control rods and to restrict sudden movement thereof.

5. In a motor vehicle having guiding road wheels, a transverse steering control rod connected to steer one of said wheels, a lateral arm pivotally connected to said steering control rod and extending toward one side of the vehicle, a steering tube and steering gear, a steering lever pivoted to said lateral arm between its ends and connected to be moved in an arcuate path by said steering gear, and a compensating lever pivotally mounted at one end in spaced relation to said steering lever and pivoted at its other end to the free end of said lateral arm, said compensating lever being adapted to describe a smaller arc than that of said steering lever to influence the point of connection between said lateral arm and said steering control rod to move in substantially a straight transverse line.

6. In a motor vehicle having guiding road wheels, a pair of transverse steering control rods connected to said road wheels and terminating adjacent the vehicle centerline, a lateral arm pivotally connected to the adjacent ends of said control rods and extending parallel thereto toward one side of said vehicle, a steering lever pivotally connected to said lateral arm between its ends, means for rocking said steering lever, and a compensating lever pivotally anchored at one end in spaced parallel relation to said steering lever and adapted to be moved arcuately, said compensating lever being pivoted at its other end to the free end of said lateral arm, the length of said compensating lever and the arc described by its travel being less than that of said steering lever to constrain the movement of said lateral arm at the point of said pivotal connection with said steering control rods in substantially a straight line.

7. In a motor vehicle having guiding road wheels, a transverse steering control rod connected to steer one of said wheels, a lateral arm pivotally connected to said steering control rod and extending toward one side of said vehicle, a steering column, a steering tube and steering gear, a steering lever pivoted to said lateral arm between its ends and connected to be moved in an arcuate path by said steering gear, and a compensating lever mounted in spaced relation to said steering lever upon a fixed pivot adjacent said steering column and pivoted at one end to the free end of said lateral arm, said compensating lever being adapted to describe a smaller arc than that of said steering lever to influence the point of connection between said lateral arm and said steering control rod to move substantially in a straight transverse line.

8. In a motor vehicle having a frame and guide road wheels, a pair of transverse steering control rods connected to said road wheels and terminating adjacent the vehicle centerline, a lateral arm pivotally connected at one end to the inner ends of said control rods and extending parallel thereto toward one side of the vehicle, a steering lever pivotally connected to said lateral arm between its ends, a means operable to swing said steering lever, a shock absorber fixed on the vehicle frame, and compensating lever means connected to the shock absorber and pivoted on the free end of said lateral arm, said compensating lever means being substantially parallel with said steering lever and adapted to constrain the point of connection between said lateral arm and said steering control arms to move in substantially a straight line transversely of the vehicle.

FRANK C. BEST.